US008433737B1

(12) United States Patent
Kintigh

(10) Patent No.: US 8,433,737 B1
(45) Date of Patent: Apr. 30, 2013

(54) SPURIOUS DDS SIGNAL SUPPRESSION

(75) Inventor: Dana W. Kintigh, Acton, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 1191 days.

(21) Appl. No.: 12/277,824

(22) Filed: Nov. 25, 2008

Related U.S. Application Data

(60) Provisional application No. 60/991,551, filed on Nov. 30, 2007.

(51) Int. Cl.
*G06F 1/02* (2006.01)
(52) U.S. Cl.
USPC .......................................................... 708/271
(58) Field of Classification Search .................. 708/271
See application file for complete search history.

(56) References Cited

U.S. PATENT DOCUMENTS 7,167,528 B2 * 1/2007 Chen et al. ................... 375/302
2008/0090516 A1 * 4/2008 Thomas et al. .............. 455/12.1

OTHER PUBLICATIONS

Unpublished, Confidential and Proprietary Lockheed Martin Corporation PowerPoint Presentation—Missiles and Fire Control—"Low Spurious DDS Technique", Kintigh, D.W., Nov. 30, 2007 (pp. 1-9).
Analog Devices—"*AD9910 1 GSPS, 14-Bit, 3.3 V CMOS Direct Digital Synthesizer*" Data Sheets; Nov. 16, 2007 (pp. 1-2).
Analog Devices—"*1 GSPS, 14-Bit, 3.3 V CMOS Direct Digital Synthesizer*" AD9910 Rev. 0 (2007) (pp. 1-60).
Wikipedia—*Direct Digital Synthesis*—Nov. 16, 2007 (pp. 1-3).

* cited by examiner

*Primary Examiner* — Tan V. Mai
(74) *Attorney, Agent, or Firm* — Lee, Jorgensen, Pyle & Kewalramani, P.C.

(57) ABSTRACT

A technique for the suppression of spurious Direct Digital Synthesis ("DDS") signals includes a method and an apparatus that equally and oppositely dithers a pair of complementary input digital words from which a pair of analog signals are direct digital synthesized and then mixes the generated analogy signals.

30 Claims, 2 Drawing Sheets

SPURIOUS DDS SIGNAL SUPPRESSION

The earlier effective filing date of co-pending U.S. Provisional Application Ser. No. 60/991,551, entitled, "Spurious DDS Signal Suppression", filed Nov. 30, 2007, in the name of the inventor Dana W. Kintigh is hereby claimed for all common subject matter under 35 U.S.C. §120. This application is also hereby incorporated by reference for all purposes as if set forth verbatim herein.

BACKGROUND OF THE INVENTION

1. Field of the Invention

The present invention pertains to applications for Direct Digital Synthesis ("DDS"), and, more particularly, the suppression of spurious DDS signals.

2. Description of the Related Art

Conventional DDS's generate discrete sidebands as spurious signals combined with their desired output frequency. These are problematic for sensor and radar applications which require sources of clean frequencies without spurious signals. This can be the limiting factor in the performance of advanced sensor and radar systems. Existing systems must either live with this performance impact or use complex, costly radio frequency ("RF") circuits with limited frequency agility to generate critical source signals. In current DDS applications that filter the DDS output, the high spurious level requires that the output frequency pass through a complex mix, divide and filter process to reduce the spurious signal levels to a usable level. This level is more than 20 dB below the present capability of conventional DDS's.

More particularly, filtering the DDS spurious energy is possible for some very limited applications—i.e., fixed, non-adjustable frequencies. The required precision and narrowness of the needed filters is extremely challenging and greatly increases the cost of the sub-system. These restrictions normally make this approach impractical for most applications. High performance systems generally cannot use DDS's directly to generate critical signals. Indirect methods are used to generate frequencies with low spurious signals but are limited by the additional circuit complexity needed to individually produce each additional frequency used by the system.

The present invention is directed to resolving, or at least reducing, one or all of the problems mentioned above.

SUMMARY OF THE INVENTION

The present invention includes a method and apparatus for the suppression of spurious DDS signals.

In a first aspect, the present invention is a method, comprising: receiving a pair of complementary input digital words; equally and oppositely dithering the complementary input digital words; direct digital synthesizing a pair of analog signals from the dithered digital words; and mixing the generated analog signals.

In a second aspect, the invention is a method, comprising: pseudo-randomly generating a digital offset; receiving a pair of complementary input digital words; subtracting the digital offset from a first one of the input digital words and adding the digital offset to a second one of the input digital words to create a pair of offset digital words; direct digital synthesizing a pair of analog signals from the offset digital words; and mixing the generated analog signals.

In a third aspect, the invention is an apparatus, comprising: a pseudo-random number generator capable of generating a digital offset; an adder capable of adding the digital offset to a first input digital word; a first direct digital synthesis device capable of generating a first analog signal from the first offset digital word; a subtractor capable of subtracting the digital offset from a second digital word, the second digital word being complementary to the first second digital word; a second direct digital synthesis device capable of generating a second analog signal using from the second offset digital word; and a mixer capable of mixing the first and second analog signals In a fourth aspect, the invention is an apparatus, comprising: means for equally and oppositely dithering a pair of complementary input digital words; a first direct digital synthesis device capable of generating a first analog signal from a first one of the dithered input digital words; a second direct digital synthesis device capable of generating a second analog signal using from a second one of the dithered digital words; and means for mixing the first and second analog signals.

In a fifth aspect, the invention is an apparatus, comprising: means for pseudo-randomly generating a digital offset; means for subtracting the digital offset from a first one of a pair of received input digital words and adding the digital offset to a second one of the input digital words to create a pair of offset digital words; means for direct digital synthesizing a pair of analog signals from the offset digital words; and means for mixing the generated analog signals.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The invention uses two or more direct digital synthesizers (DDS's), each producing a random or pseudo-random, time varying, fractional portion of the final desired frequency in such a way as to spread the spurious signal energy to minimize the impact on the system performance without degrading the desired signal. It is estimated that the peak spurious signals can be reduced 20 dB or more by this method.

Figure 1:
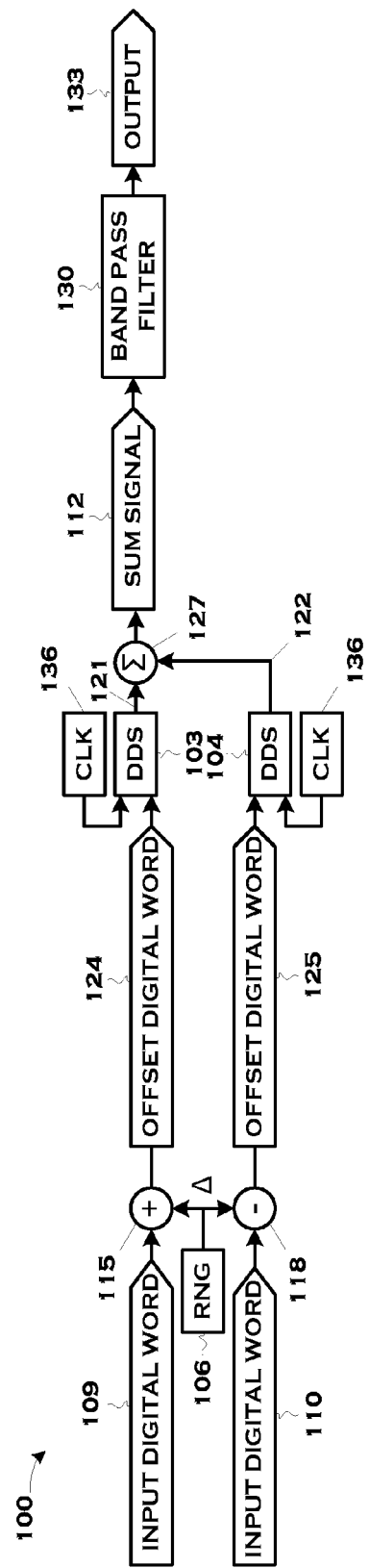
FIG. 1 depicts in a block diagram one particular embodiment of an apparatus in accordance with the present invention.
Figure 2:
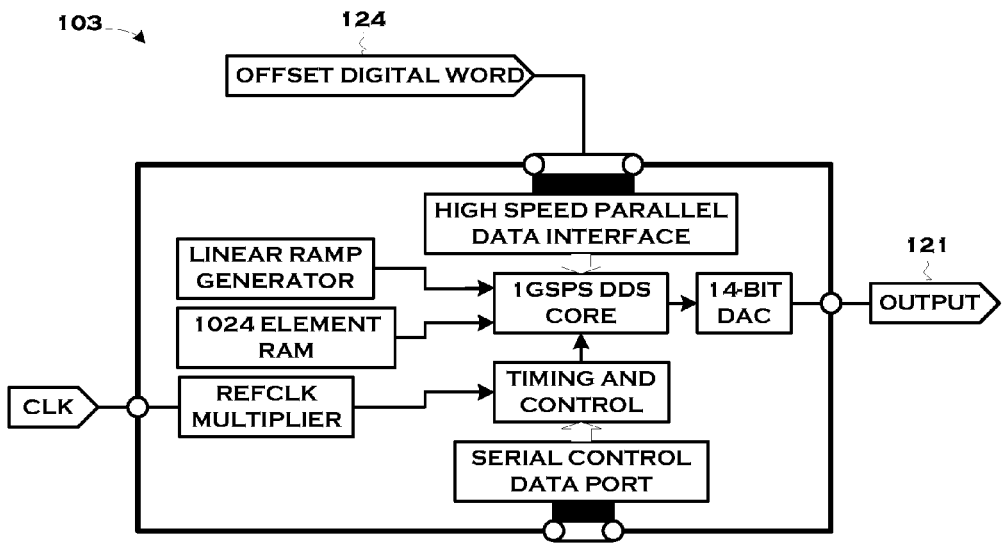
FIG. 2 is a block diagram of one particular DDS as provided by the vendor and as would be employed in the apparatus of FIG. 1.

FIG. 1 illustrates one particular embodiment 100 of an apparatus constructed and operated in accordance with the present invention. The structure and operation of the apparatus 100 revolves around the DDS's 103, 104. The DDS's are, preferably, matched, although this is not necessary to the practice of the invention. Any suitable DDS known to the art may be employed. One particular embodiment employs a pair of AD9910 DDS's commercially available off the shelf from Analog Devices, Inc., who can be reached at One Technology Way, P.O. Box 9106, Norwood, Mass. 02062-9106; phone 1-800-262-5643, or over the World Wide Web of the Internet at www.analog.com. Selected characteristics of the AD9910 provided by the vendor are set forth in Table 1 below. FIG. 2 is a block diagram of an AD9910 103, as provided by the vendor and as would be employed in the apparatus of FIG. 1.

TABLE 1

Selected Characteristics of Analog Devices AD9910 DDS

| | |
|---|---|
| 1000 MHz Master fclk | 14 bit Resolution |
| 32 bit Tuning Word Width | 20 mA FS $I_{out}$ (mA nom) |
| 0.5V Compliance Range (V) | REFCLK Multiplier |
| On-Board Comparator | Parallel, Serial I/O Interface |
| GSPS internal clock speed (up to 400 MHz analog output) | Integrated 1 GSPS, 14-bit digital-to-analog converter ("DAC") |
| 32-bit tuning word | Phase noise $\leq$−125 dBc/Hz @ 1 kHz offset (400 MHz carrier) |
| Excellent dynamic performance with >80 dB narrow-band SFDR | Serial input/output (I/O) control |
| Automatic linear or arbitrary frequency, phase, and amplitude sweep capability | 8 frequency and phase offset profiles |
| 1.8 V and 3.3 V power supplies | Software and hardware controlled power-down |
| 100-lead TQFP_EP package | Integrated 1024 word × 32-bit RAM |

As will be appreciated by those skilled in the art, each DDS 103, 104 will generate an analog output 121, 122 whose frequency is determined by a binary, digital word 109, 110 input to the memory of the DDS. The input digital words 109, 110 are sometimes called "digital control signals". They may be generated by and received from digital oscillators (not shown) or any other technique well known to the art. The generation of digital control signals, such as the input digital words 109, 110, is well known in the art and any suitable technique may be employed.

In the present invention, the input is split between the two DDS's 103, 104 and dithered with a digital offset Δ. Thus, the first and second input digital words 109, 110 are "complementary" in the sense that they represent two frequencies $F_1$, $F_2$ of the analog output 121, 122 that, when summed, equal the output frequency $F_{out}$ of the sum signal 112. Thus, if one wishes to achieve an output signal where $F_{out}$=100 MHz, one may chose the input digital words 109, 110 so that $F_1$=80 MHz and $F_2$=20 MHz. The two input frequencies $F_1$, $F_2$ represented by the input digital words 109, 110 can have a ratio of eight or greater to allow easy filtering although this is not required.

The present invention is, in theory, not limited by the magnitude $F_{out}$. However, the present invention may predominantly be employed with frequencies from radio frequency through microwave, including very high frequency ("VHF") and ultra high frequency ("UHF").

The digital offset Δ can be determined, for example, by the pseudo-random number generator ("PRNG") 106. The digital offset Δ can be a random function or can be a specialized set of numbers to provide a lower spurious signal level. Those in the art will appreciate that pseudo-random number generators are also frequently referred to as "random number generators" because, for all practical purposes, the number is random. However, "random number generators" determine the seed in a deterministic fashion, and so are actually "pseudo-random number generators". The random function by which the pseudo-random generator 106 is seeded is typically be tailored to Doppler bin size and Pulse Repetition Interval ("PRI"). In the illustrated embodiment, the typical Doppler bin size is 200 Hz and the PRI is several milliseconds.

More particularly, the spurious signals of a conventional DDS are a function of the output frequency, phase accumulator design, and number of bits in the digital-to-analog converter ("DAC"). For a single DDS, spurious signals are 'fixed' in frequency. In the present invention, the two input frequencies represented by the input digital words 109, 110 are dithered equally and oppositely so that the desired sum signal 112 is generated without degradation:

$$F_{out}=(F_1+\Delta)+(F_2-\Delta)=F_1+F_2,$$

where Δ is the digital offset by which the frequencies $F_1$, $F_2$ are dithered. The spurious signals of $F_1$, $F_2$ move in frequency 'space'.

The apparatus 100 includes an adder 115 and a subtractor 118 which actually dither the first and second input digital words 109, 110 with the digital offset Δ. The adder 115 adds the digital offset Δ to the first digital input word 109 to create the first offset digital word 124. The subtractor 118 subtracts the digital offset Δ from the second input digital word 110 to create the second offset digital word 125. Thus, the PRNG 106, adder 115, and subtractor 118 comprise, in the illustrated embodiment, a means for equally and oppositely dithering the input digital words 109, 110. However, it is by way of example and illustration, but one means for doing so, and alternative embodiments may employ alternative means. It is the first and second offset digital words 124, 125 from which the DDS's 103, 104 generate the analog outputs 121, 122.

The analog outputs 121, 122 are then mixed (or "multiplied") by the mixer 127 to generate the sum signal 112 with the frequency $F_{out}$. The illustrated embodiment also applies an optional bandpass filter 130 to the sum signal 112 to generate a filtered output 133. However, alternative embodiments may forego this filtering or add additional processing and/or conditioning to the sum signal 112 prior to its use.

Figure 3:
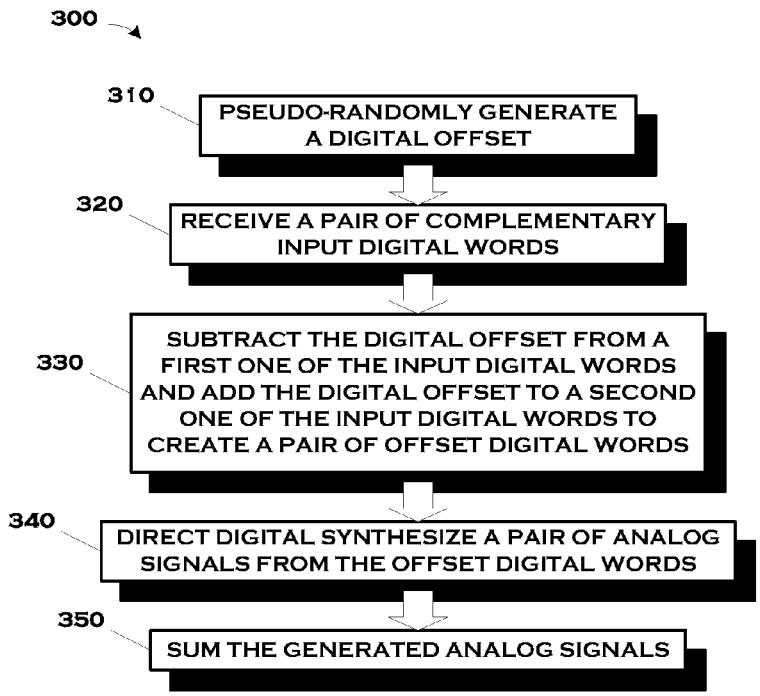
FIG. 3 illustrates one particular embodiment of a method performed in accordance with one aspect of the present invention.

Turning now to FIG. 3, in operation, the apparatus 100, shown in FIG. 1, performs a method 300. The method begins with pseudo-randomly generating (at 310) a digital offset Δ and receiving (at 320) a pair of complementary input digital words 109, 110. The digital offset Δ is then subtracted (at 330) the digital offset Δ from a first one of the input digital words 110 and adding the digital offset Δ to a second one of the input digital words 109 to create a pair of offset digital words 124, 125. The method 300 then direct digital synthesizes (at 340) a pair of analog signals 121, 122 from the offset digital words 124, 125. The analog signals 121, 122 are then summed (at 350).

The present invention admits variation in implementation. For example, the present invention can be applied to the phase and amplitude adjustment port of the DDS. Indeed, all three of these options can be employed at the same time in some embodiments. Another area admitting variation is the final form of a given implementation. For example, the apparatus 100 may be incorporated into a mixed application specific integrated circuit ("ASIC") or a field programmable gate array ("FPGA") with an external DAC or a standalone DDS.

The present invention therefore offers the ability to achieve better spurious performance at low cost. It can generate adjustable frequencies with low spurious signals with a circuit that has reduced complexity. The reduction of spurious levels is greater than for other methods. A large portion of this circuit is digital which also reduces variability and production costs.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:
1. A method, comprising:
receiving a pair of complementary input digital words;
equally and oppositely dithering the complementary input digital words;
direct digital synthesizing a pair of analog signals from the dithered digital words; and
mixing the generated analog signals.
2. The method of claim 1, wherein equally and oppositely dithering the complementary input digital words includes:
pseudo-randomly generating a digital offset;
subtracting the digital offset from a first one of the input digital words; and
adding the digital offset to a second one of the input digital words.
3. The method of claim 1, wherein the frequencies represented by the input digital words have a ratio$\geq 8$.
4. The method of claim 1, wherein mixing the generated analog signals produces an output signal have a frequency in the range from radio frequencies to microwave frequencies inclusive.
5. The method of claim 1, further comprising conditioning the mixed analog signals.
6. A method, comprising:
pseudo-randomly generating a digital offset;
receiving a pair of complementary input digital words;
subtracting the digital offset from a first one of the input digital words and adding the digital offset to a second one of the input digital words to create a pair of offset digital words;
direct digital synthesizing a pair of analog signals from the offset digital words; and
mixing the generated analog signals.
7. The method of claim 6, wherein the frequencies represented by the input digital words have a ratio$\geq 8$.
8. The method of claim 6, wherein mixing the generated analog signals produces an output signal have a frequency in the range from radio frequencies to microwave frequencies inclusive.
9. The method of claim 6, further comprising conditioning the mixed analog signals.
10. An apparatus, comprising:
a pseudo-random number generator capable of generating a digital offset;
an adder capable of adding the digital offset to a first input digital word;
a first direct digital synthesis device capable of generating a first analog signal from the first offset digital word;
a subtractor capable of subtracting the digital offset from a second digital word, the second digital word being complementary to the first second digital word;
a second direct digital synthesis device capable of generating a second analog signal using from the second offset digital word; and
a mixer capable of mixing the first and second analog signals.
11. The apparatus of claim 10, wherein the first and second direct digital synthesis devices are matched.
12. The apparatus of claim 10, wherein the pseudo-random number generator, adder, and subtractor comprise a means for equally and oppositely dithering the complementary input digital words.
13. The apparatus of claim 10, wherein the frequencies represented by the first and second digital words have a ratio$\geq 8$.
14. The apparatus of claim 10, further comprising means for conditioning the mixed analog signals.
15. The apparatus of claim 10, wherein the mixer comprises means for mixing the first and second analog signals.
16. An apparatus, comprising:
means for equally and oppositely dithering a pair of complementary input digital words;
a first direct digital synthesis device capable of generating a first analog signal from a first one of the dithered input digital words;
a second direct digital synthesis device capable of generating a second analog signal using from a second one of the dithered digital words; and
means for mixing the first and second analog signals.
17. The apparatus of claim 16, wherein the first and second direct digital synthesis devices are matched.
18. The apparatus of claim 16, wherein the dithering means comprises:
a pseudo-random number generator capable of generating a digital offset;
an adder capable of adding the digital offset to the first one of the input digital words; and
a subtractor capable of subtracting the digital offset from the second one of the digital input words.
19. The apparatus of claim 16, wherein the mixing means comprises an adder.
20. The apparatus of claim 16, wherein the frequencies represented by the input digital words have a ratio$\geq 8$.
21. The apparatus of claim 16, further comprising means for conditioning the mixed analog signals.
22. The apparatus of claim 16, wherein the mixing means comprises a mixer.
23. An apparatus, comprising:
means for pseudo-randomly generating a digital offset;
means for subtracting the digital offset from a first one of a pair of received input digital words and adding the digital offset to a second one of the input digital words to create a pair of offset digital words;
means for direct digital synthesizing a pair of analog signals from the offset digital words; and
means for mixing the generated analog signals.
24. The apparatus of claim 23, wherein the means for direct digital synthesizing a pair of analog signals comprises:
a first direct digital synthesis device capable of generating a first analog signal from a first one of the dithered input digital words; and a second direct digital synthesis device capable of generating a second analog signal using from a second one of the dithered digital words.

25. The apparatus of claim 24, wherein the first and second direct digital synthesis devices are matched.

26. The apparatus of claim 23, wherein the frequencies represented by the input digital words have a ratio≧8.

27. The apparatus of claim 23, further comprising means for conditioning the mixed analog signals.

28. The apparatus of claim 23, wherein the mixing means comprises a mixer.

29. The apparatus of claim 23, wherein the pseudo-randomly generating means comprises a pseudo-random number generator capable of generating a digital offset.

30. The apparatus of claim 23, wherein the subtracting and adding, means comprises:
   an adder capable of adding the digital offset to the first one of the input digital words; and
   a subtractor capable of subtracting the digital offset from the second one of the digital input words.

* * * * *